United States Patent
Ogino et al.

(10) Patent No.: US 8,513,846 B2
(45) Date of Patent: Aug. 20, 2013

(54) MOTOR WITH CASE LID FIXING STRUCTURE

(75) Inventors: Hisashi Ogino, Matsudo (JP); Mitsushi Kinoshita, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 156 days.

(21) Appl. No.: 12/920,715

(22) PCT Filed: Jan. 6, 2009

(86) PCT No.: PCT/JP2009/050022
§ 371 (c)(1),
(2), (4) Date: Sep. 2, 2010

(87) PCT Pub. No.: WO2009/119121
PCT Pub. Date: Oct. 1, 2009

(65) Prior Publication Data
US 2011/0006628 A1  Jan. 13, 2011

(30) Foreign Application Priority Data

Mar. 27, 2008  (JP) .................................. 2008-82930

(51) Int. Cl.
*H02K 5/15* (2006.01)
*H02K 5/04* (2006.01)
*H02K 15/14* (2006.01)

(52) U.S. Cl.
USPC ............................................. 310/89; 29/596

(58) Field of Classification Search
USPC .............. 310/88, 89, 90, 91, 12.02, 348, 364;
310/154.08, 154.15, 154.41, 156.21, 216.058;
29/898, 890.127, 527.2, 598, 596, 844, 843,
29/888.049, 888.074, 898.12, 402.19
See application file for complete search history.

(56) References Cited

U.S. PATENT DOCUMENTS

| | | | | |
|---|---|---|---|---|
| 3,165,654 A | * | 1/1965 | Mabuchi | 310/46 |
| 3,707,037 A | * | 12/1972 | Gutris | 29/596 |
| 4,644,204 A | * | 2/1987 | Lakin | 310/89 |
| 4,853,576 A | * | 8/1989 | Mayumi et al. | 310/239 |
| 5,034,640 A | * | 7/1991 | Shimizu | 310/71 |
| 5,199,171 A | * | 4/1993 | Umezawa et al. | 29/898.07 |
| 5,270,599 A | * | 12/1993 | Aoyagi et al. | 310/71 |
| 6,031,308 A | * | 2/2000 | Kinoshita et al. | 310/83 |
| 6,700,254 B2 | * | 3/2004 | Wong | 310/89 |
| 6,717,322 B2 | * | 4/2004 | Lee | 310/239 |
| 2002/0113506 A1 | * | 8/2002 | Wong | 310/89 |
| 2004/0066104 A1 | * | 4/2004 | Kikuchihara et al. | 310/71 |

FOREIGN PATENT DOCUMENTS

| | | |
|---|---|---|
| JP | 56-30553 | 3/1981 |
| JP | 4-153 | 1/1992 |
| JP | 5-8012 | 2/1993 |
| JP | 9-322468 | 12/1997 |
| JP | 2005-341733 | 12/2005 |

* cited by examiner

Primary Examiner — Burton Mullins
(74) Attorney, Agent, or Firm — McGlew and Tuttle, P.C.

(57) ABSTRACT

The present invention enables firm fixation between a motor casing and a casing lid at low cost through employment of a simple structure without need to use adhesive. A casing lid made of resin is fixedly fitted to an opening portion of a motor casing made of metal. Grooves or depressions are provided at the bottoms of a plurality of fixation portions provided on the casing lid at constant intervals in the circumference direction thereof. Bend portions at the opening portion of the motor casing are caused to bite into the grooves or depressions of the casing lid fitted into the opening portion of the motor casing, whereby the motor casing and the casing lid are fixed together.

2 Claims, 8 Drawing Sheets

A-A SECTION

FIG. 7(A)
PRESENT INVENTION

- ● ··· NO LOOSENESS
- ▲ ··· OCCURRENCE OF LOOSENESS (SMALLER IN MAGNITUDE THAN LOOSENESS ASSOCIATED WITH CONVENTIONAL TECHNIQUE)
- □ ··· OCCURRENCE OF LOOSENESS

MOTOR WITH CASE LID FIXING STRUCTURE

TECHNICAL FIELD

The present invention relates to a casing lid fixing structure of a motor in which the casing lid made of resin is fixedly fitted to an opening portion of a motor casing made of metal.

BACKGROUND ART

A housing of a small-sized motor is configured such that a casing lid made of resin is fitted to an opening portion of a motor casing which is formed from metal into a closed-bottomed tubular shape. Patent Document 1 discloses an example of a conventional structure for fixing together a motor casing made of metal and a casing lid made of resin.

Figure 8:
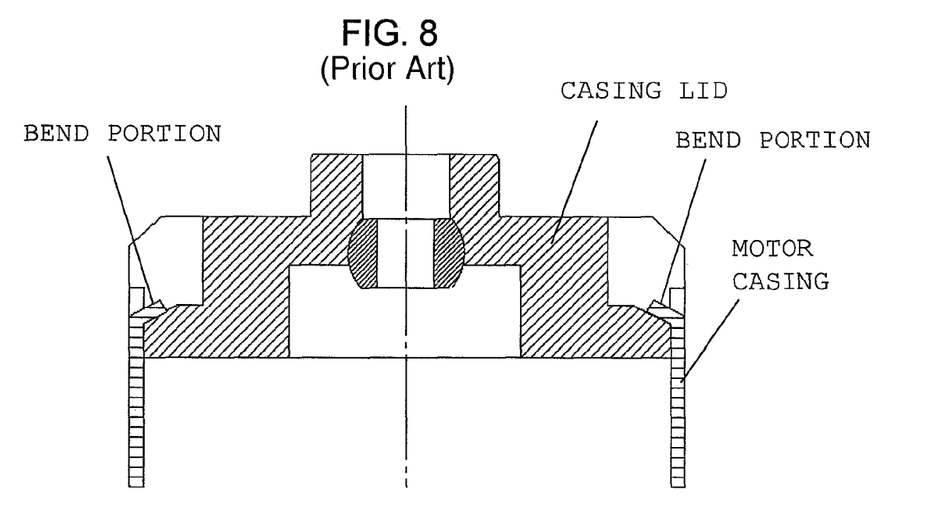
FIG. 8 is a view showing an example of a conventional fixing structure.

FIG. 8 is a view showing an example of a conventional fixing structure (refer to FIG. 1(c) of Patent Document 1). As illustrated, after the casing lid made of resin is fitted to an opening portion of the motor casing made of metal, an opening end portion of the motor casing is bent at several positions (bend portions in FIG. 8) by use of a punch, and the bend portions are pressed against (brought into close contact with) the casing lid for fixation. In this manner, by means of bending the opening end portion of the motor casing, the casing lid can be fixed in a sufficiently firm manner. However, in the case of a casing lid having a large volume and a complicated shape, the casing lid is susceptible to dimensional changes under the influence of temperature and humidity. Particularly, upon occurrence of a dimensional change of the casing lid toward the center of the casing lid, clearance is generated at fixed portions, resulting in the occurrence of a defect of loosening of fixation between the motor casing and the casing lid. When, in order to restrain the occurrence of loosening, the bend portions of the motor casing are increased in length and bent deeper, deformation or breakage of the casing lid may result.

Figure 9:
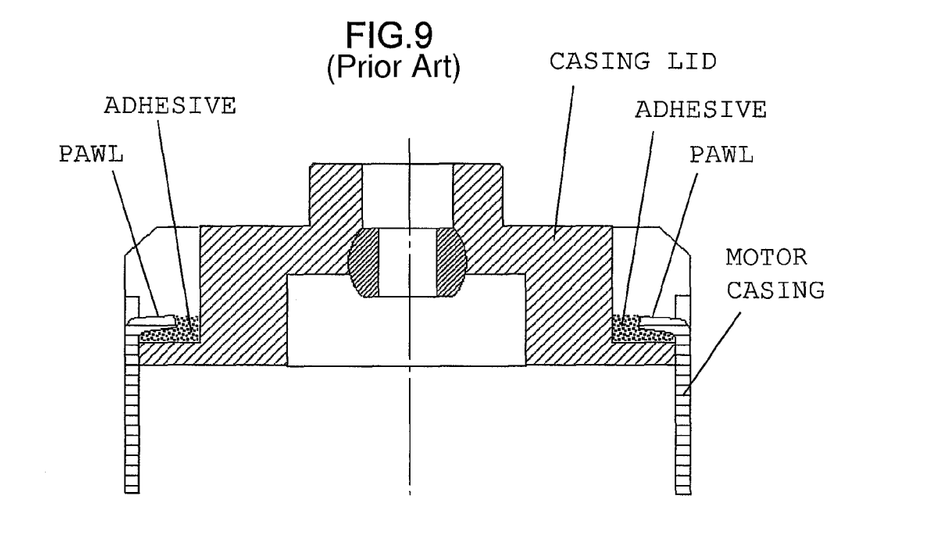
FIG. 9 is a view showing another example of a conventional fixing structure.

FIG. 9 is a view showing another example of a conventional fixing structure (refer to FIG. 4(b) of Patent Document 1). An opening end portion of the motor casing is bent at several positions (pawls in FIG. 9) by use of a punch; however, the pawls are not pressed against (not brought into close contact with) the casing lid, but adhesive is charged between the pawls and the casing lid for fixation. By means of fixing together the casing lid and the bent pawls by use of adhesive, the casing lid can be fixed in a sufficiently firm manner. However, because of differences in thermal expansion coefficient among the metal used to form the motor casing, the resin used to form the casing lid, and the adhesive, separation arises at the bonded positions under the influence of temperature and humidity unless the metal, the resin, and the adhesive are fused together; thus, loosening of fixation between the motor casing and the casing lid arises. Also, use of adhesive increases cost.

Patent Document 1: Japanese Utility Model Application Laid-Open (kokai) No. S56-30553.

DISCLOSURE OF THE INVENTION

Problems to be Solved by the Invention

An object of the present invention is to solve the above-mentioned problems and to enable firm fixation between a motor casing and a casing lid at low cost through employment of a simple structure without need to use adhesive.

Also, an object of the present invention is to prevent the occurrence of loosening of fixation between the motor casing and the casing lid through restraint of deformation of the entire casing lid even upon occurrence of a dimensional change of the casing lid made of resin toward the center of the casing lid under the influence of temperature and humidity.

Means for Solving the Problems

According to the present invention, in a motor in which a casing lid made of resin is fixedly fitted to an opening portion of a motor casing made of metal, the casing lid has a plurality of fixation portions along an outer circumference thereof, and portions of the motor casing located at the opening portion of the motor casing are caused to bite into the respective fixation portions of the casing lid for fixing the motor casing and the casing lid together.

Also, the portions of the motor casing located at the opening portion of the motor casing are bend portions, and tips of the bend portions bite into the respective fixation portions of the casing lid. There are provided noncontact regions which are located at circumferentially central portions of the tips of the bend portions and in which the tips of the bend portions do not come into contact with the fixation portions of the casing lid. Resin of those portions of the casing lid into which the tips of the bend portions bite escapes into the noncontact regions. The noncontact regions can be grooves or depressions.

Effects of the Invention

According to the present invention, by means of the portions of the motor casing located at the opening portion of the motor casing being caused to bite into the respective fixation portions of the casing lid, there can be prevented the occurrence of loosening of fixation between the motor casing and the casing lid.

Also, by means of the portions of the motor casing located at the opening portion of the motor casing being bent such that the tips of the bend portions bite into the respective fixation portions of the casing lids, a biting process is facilitated. Further, by means of provision of the noncontact region such that, when the tip of each of the bend portions is caused to bite into the fixation portion of the casing lid, the tip does not come into contact with the fixation portion of the casing lid in the noncontact region, as compared with the case where the entire tip of the bend portion is in contact with the fixation portion of the casing lid, a force to urge biting can be concentrated through reduction of contact area, thereby facilitating the biting action.

Also, by means of resin of bitten portions of the casing lid being allowed to escape into the noncontact regions, deformation of the entire casing lid can be prevented, and nonuse of adhesive reduces cost. Further, by means of the noncontact regions assuming the form of grooves or depressions, bent end portions of the motor casing readily bite into the casing lid. Thus, even upon occurrence of a dimensional change of the casing lid toward the center of the casing lid, the bite of the bent end portions of the motor casing restrain deformation of the casing lid; as a result, the occurrence of loosening of fixation between the motor casing and the casing lid can be prevented.

BRIEF DESCRIPTION OF THE DRAWINGS

FIGS. 3A and 3B are a pair of perspective views showing a recess appearing in FIG. 2A as viewed from outside, wherein FIG. 3(A) shows the recess of the casing lid and a groove portion provided at the bottom of the recess, and FIG. 3(B) shows a state in which the bend portion of the motor casing is bent in such a manner as to bite into the groove portion.

FIGS. 4A and 4B are a pair of views for explaining the relationship between the bend portion and the groove portion, wherein FIG. 4(A) shows an opening portion end of the motor casing, and FIG. 4(B) shows a state in which the bend portion is caused to bite into the groove portion.

BEST MODE FOR CARRYING OUT THE INVENTION

Figure 1:
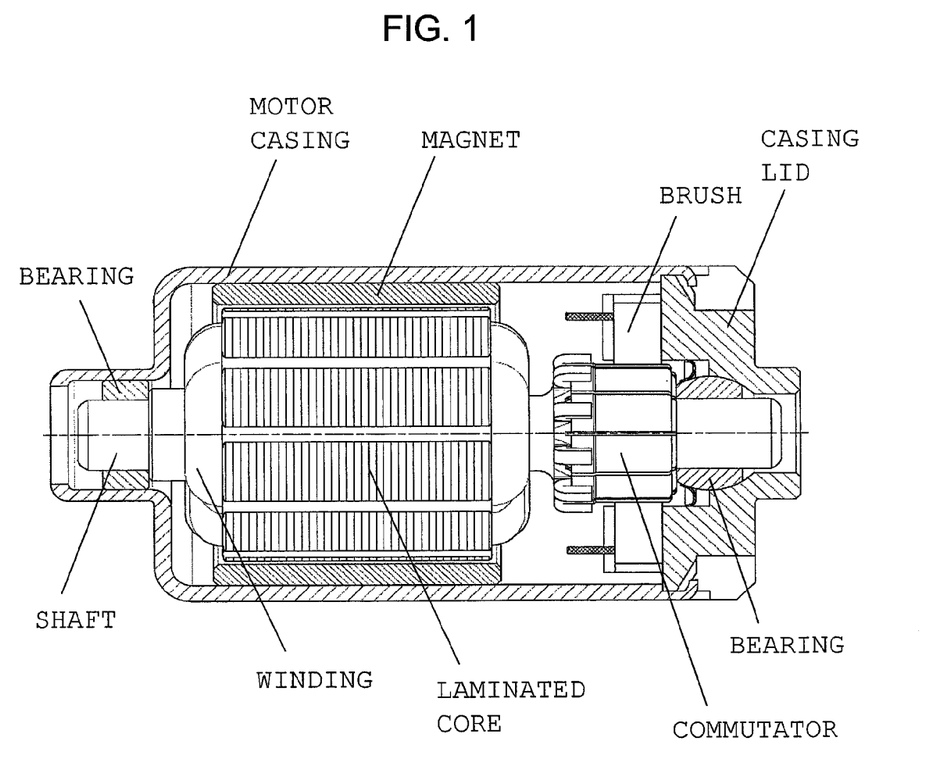
FIG. 1 is a longitudinal sectional view of a small-sized motor having a fixing structure according to the present invention for fixing a motor casing and a casing lid together.

The present invention will next be described by way of example. FIG. 1 is a longitudinal sectional view of a small-sized motor having a fixing structure according to the present invention for fixing a motor casing and a casing lid together. The present invention is applicable to a small-sized motor having any external shape, any number of field poles, or any number of rotor poles, so long as the motor is configured such that a casing lid made of resin is fixedly fitted to a casing made of metal. As illustrated, a magnet which serves as field poles is attached to the inner peripheral surface of a motor casing formed from a metal material into a closed-bottomed tubular shape. A casing lid is fitted to an opening portion of the motor casing. A central portion of the casing lid accommodates a bearing for a shaft. The other end of the shaft is supported by a bearing provided at the center of a bottom portion of the closed-bottomed tubular motor casing. Although unillustrated, the shaft is extended outwardly from at least either side and connected to an external load for driving the load.

Usually, a laminated core, windings wound on the laminated core, and a commutator are mounted on the shaft, thereby forming a rotor of the small-sized motor. A pair of brushes in contact with the commutator is connected to external terminals (not shown) via connection members (not shown) for establishing electrical connection to an external device.

Figure 2A:
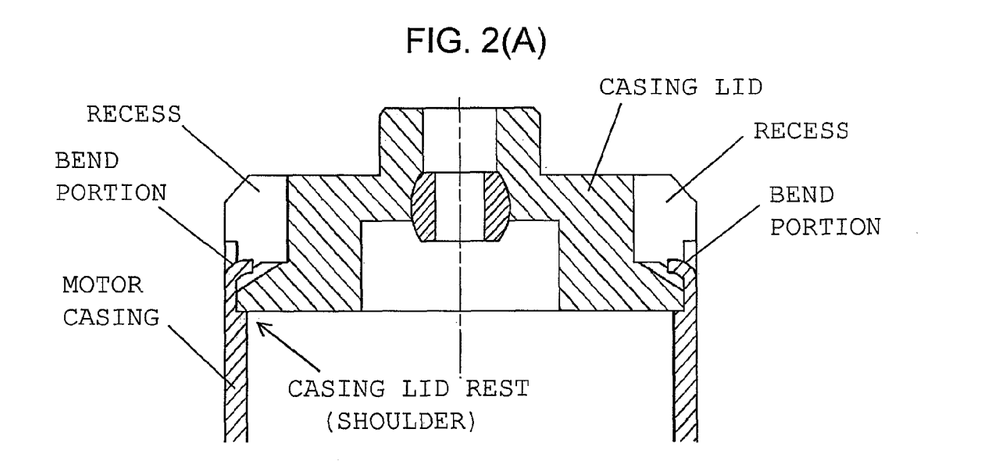
FIG. 2(A) is a view showing, in detail, the fixing structure for fixation of the motor casing and the casing lid shown in FIG. 1.
Figure 2B:
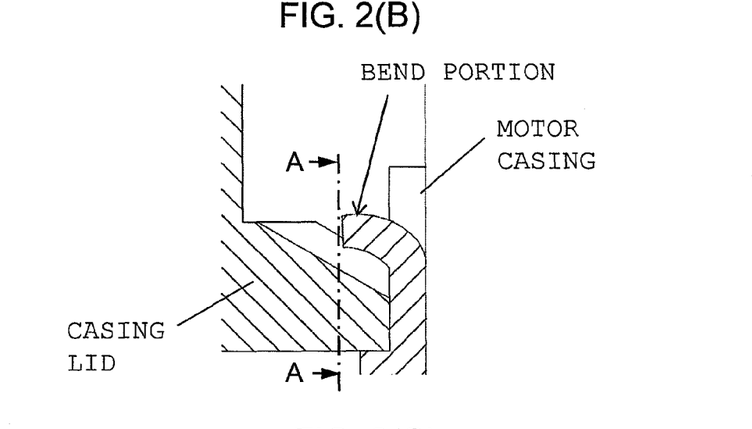
FIG. 2(B) is an enlarged view of a bend portion and its vicinity shown in FIG. 2(A)
Figure 2C:
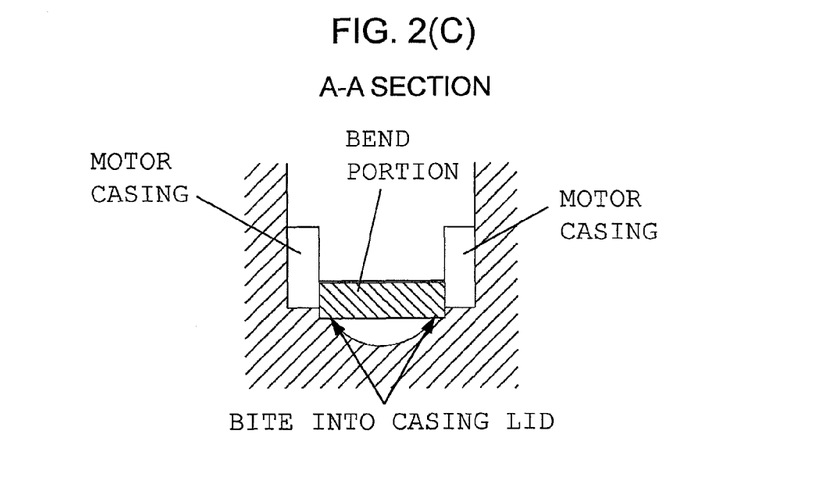
FIG. 2(C) is a sectional view taken along line A¾A of FIG. 2(B).

FIG. 2(A) is a view showing, in detail, the fixing structure for fixation of the motor casing and the casing lid shown in FIG. 1. FIG. 2(B) is an enlarged view of a bend portion and its vicinity shown in FIG. 2(A). FIG. 2(C) is a sectional view taken along line A-A of FIG. 2(B). As illustrated, the opening portion (circular shape or polygonal shape, such as quadrangular shape) of the closed-bottomed tubular motor casing has a casing lid rest along its entire peripheral surface. The casing lid rest assumes the form of a shoulder provided on the inner side of the opening portion of the motor casing. Therefore, the thickness of the opening portion of the motor casing is reduced over a range from the shoulder to an end of the opening portion. The motor casing and the casing lid are fixed together such that portions of the motor casing located at the opening portion of the motor casing are caused to bite into respective fixation portions of the casing lid. At this time, the portions of the motor casing located at the opening portion of the motor casing can be bent such that their tips bite into the respective fixation portions of the casing lid. Further, a noncontact region can be provided such that, when the tip of each of the bend portions is caused to bite into the fixation portion of the casing lid, the tip does not come into contact with the fixation portion of the casing lid in the noncontact region. By virtue of this, as compared with the case where the entire tip of the bend portion is in contact with the fixation portion of the casing lid, a force to urge biting can be concentrated through reduction of contact area, thereby facilitating the biting action. Further, resin of a bitten portion of the casing lid is allowed to escape into the noncontact region, thereby preventing deformation of the entire casing lid. Further, by means of the noncontact region assuming the form of a groove or depression, a bent end portion of the motor casing readily bites into the casing lid. Thus, even upon occurrence of a dimensional change of the casing lid toward the center of the casing lid, the bite of the bent end portion of the motor casing restrains deformation of the casing lid; as a result, the occurrence of loosening of fixation between the motor casing and the casing lid can be prevented.

The motor casing and the casing lid are fixed together as follows: after the casing lid is pressed into the motor casing until the casing lid butts against the casing lid rest (shoulder), each of the bend portions of the motor casing is caused to bite into a groove portion (see FIG. 3A) provided at the bottom of the fixation portion of the casing lid, thereby fixing the motor casing and the casing lid together. The illustrated fixation portion assumes the form of a recess provided at an outer circumferential portion of the casing lid. The casing lid rest supports the casing lid from behind the casing lid so as to allow the casing lid to sufficiently receive a force used to bend the bend portions, thereby preventing breakage of the casing lid.

As is apparent from FIG. 2(B), which is an enlarged view of a bend portion and its vicinity, the tip of the bend portion bites into the casing lid made of resin. Also, as is apparent from FIG. 2(C), which is a sectional view taken along line A-A, the tip of the bend portion bites into the casing lid made of resin, and the tip of the bend portion is slightly greater in width than the groove portion. Through employment of such a structure, the (circumferentially) left and right ends of the tip of the bend portion bite into the casing lid. In the case of such a structure, a noncontact region is provided at a (circumferentially) central portion of the tip of each bend portion. In the noncontact region, the tip of each bend portion does not come into contact with the corresponding fixation portion of the casing lid. Through employment of such a structure, resin of a bitten portion of the casing lid escapes toward the (circumferentially) central portion of the tip of the bend portion.

Figure 3A:
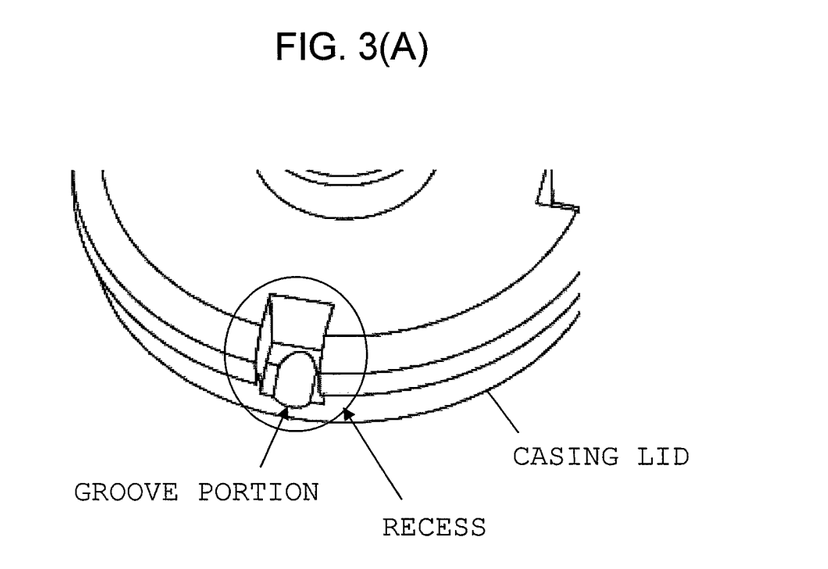
Figure 3B:
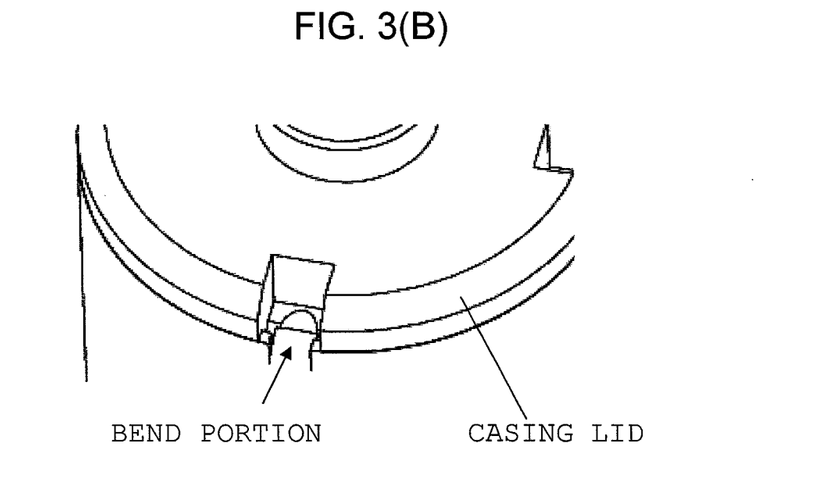

FIGS. 3A and 3B are a pair of perspective views showing the recess appearing in FIG. 2 as viewed from outside, wherein FIG. 3(A) shows the recess of the casing lid and a groove portion provided at the bottom of the recess, and FIG. 3(B) shows a state in which the bend portion of the motor casing is bent in such a manner as to bite into the groove portion. The recess is a space for receiving the bend portion together with a tool (cutting-crimping punch) for bending the bend portion and is formed by cutting out, for example, a substantially rectangular piece from an outer circumferential portion of the casing lid. The groove portion is formed by further cutting out a piece from the bottom of the recess. The casing lid has, for example, four (preferably three to five) such recesses and groove portions arranged at circumferentially equal intervals. The casing lid having the recesses and groove portions can be integrally formed by resin molding. The bend portions of the motor casing are bent into the respective thus-formed groove portions and caused to bite into the groove portions, whereby the motor casing and the casing lid are fixed together.

Figure 4A:
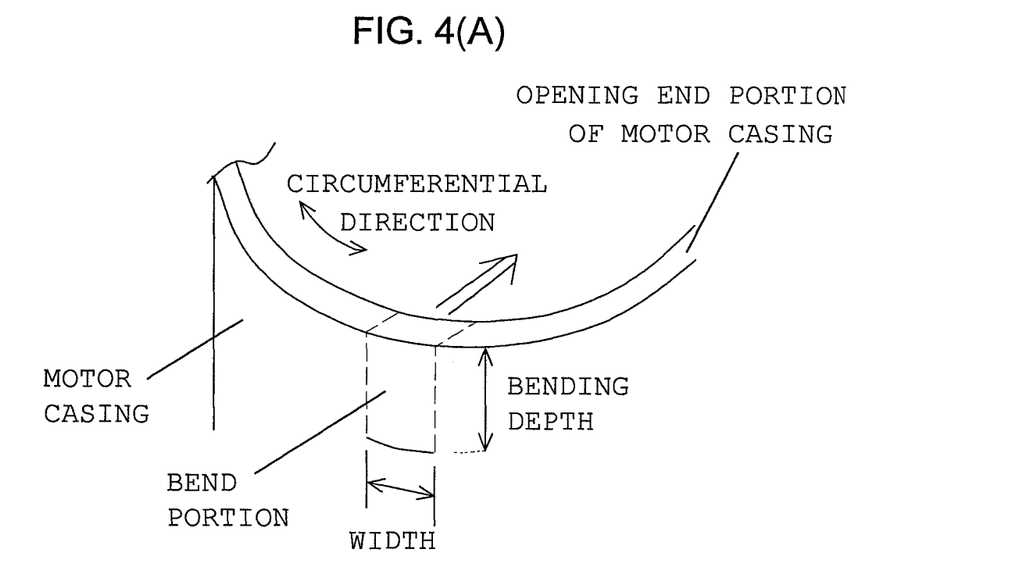
Figure 4B:
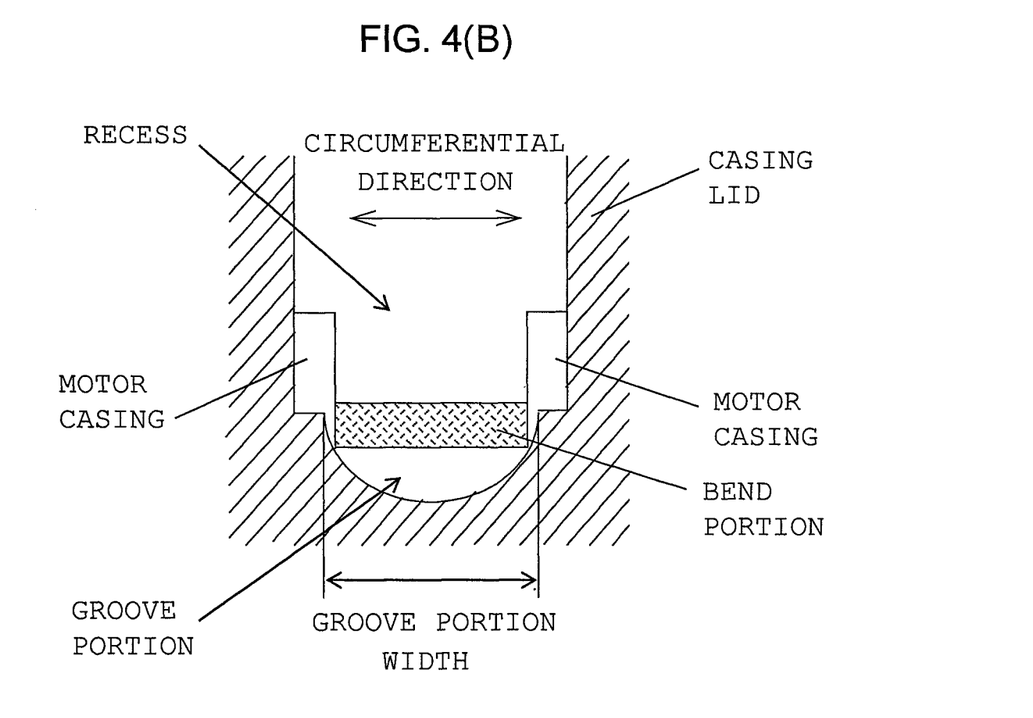

FIGS. 4A and 4B are a pair of views for explaining the relationship between the bend portion and the groove portion, wherein FIG. 4(A) shows an opening portion end of the motor casing, and FIG. 4(B) shows a state in which the bend portion is caused to bite into the groove portion. As shown in FIG. 4(A), by use of a tool (cutting-crimping punch), a portion of the motor casing corresponding to the bend portion is cut along the illustrated dotted lines and bent in the direction of the arrow from the opening portion end of the motor casing (a so-called cutting-crimping technique). The groove portion into which the bend portion bites has, for example, a circular arc cross section as shown in FIG. 4(B). Other shapes of the groove portion will be described later with reference to FIGS. 5A and 5B. As have been described with reference to FIG. 2(C), by means of rendering the bend portion slightly greater in width than the groove portion, the bend portion can sufficiently bite into the groove portion in the course of bending deformation thereof. By contrast, FIG. 4(B) shows another example in which the bend portion is rendered smaller in width than the groove portion. In this manner, by means of rendering the width of the bend portion made of metal equal to or slightly smaller than the width of the groove portion, the bend portion can internally bite into the groove portion provided on the casing lid made of resin.

Figure 5A:
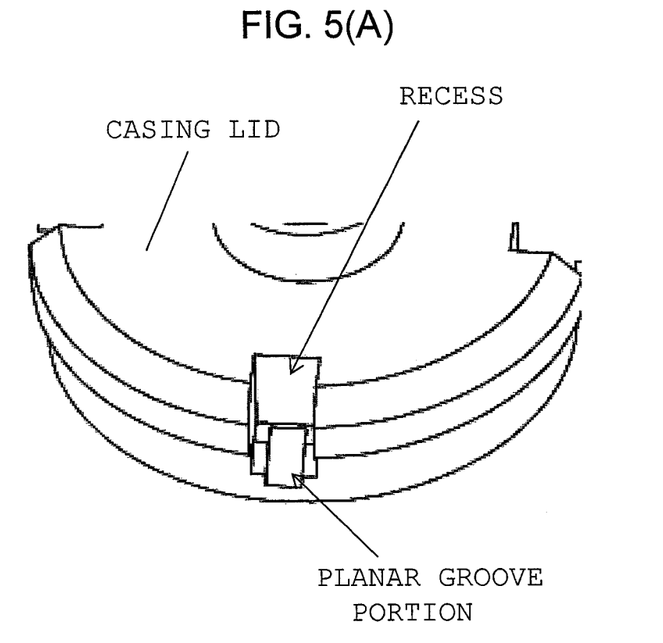
FIGS. 5A and 5B are a pair of views showing groove shapes different from that of FIG. 3(A).
Figure 5B:
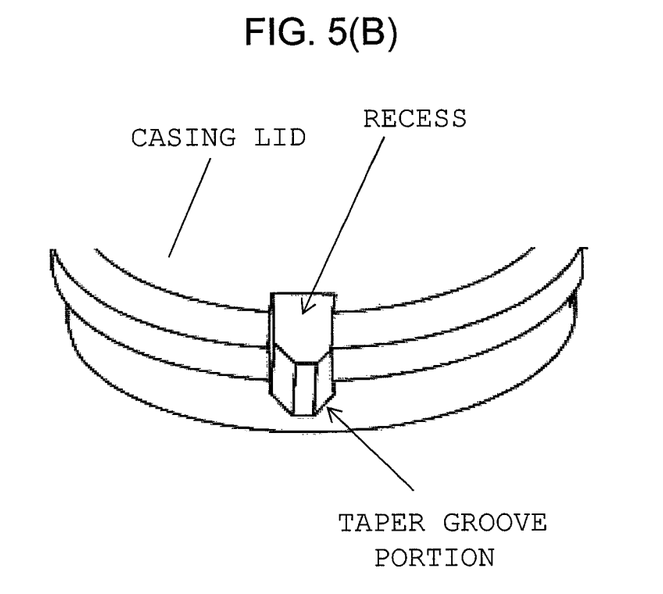

FIGS. 5A and 5B are a pair of views showing groove shapes different from those of FIG. 3(A). As shown in FIG. 5(A), a groove of the recess provided on the casing lid made of resin can be shaped such that the bottom of the groove is planar. That is, in place of a shape having the above-mentioned circular arc cross section, a shape having a planar bottom surface is employed. Alternatively, as shown in FIG. 5(B), while the bottom surface of the groove is rendered planar, the opposite side surfaces of the groove can be tapered. Even when such shapes are employed, similar to the case of the above-mentioned shape, the bend portion can be caused to bite into the groove portion for fixation.

Figure 6A:
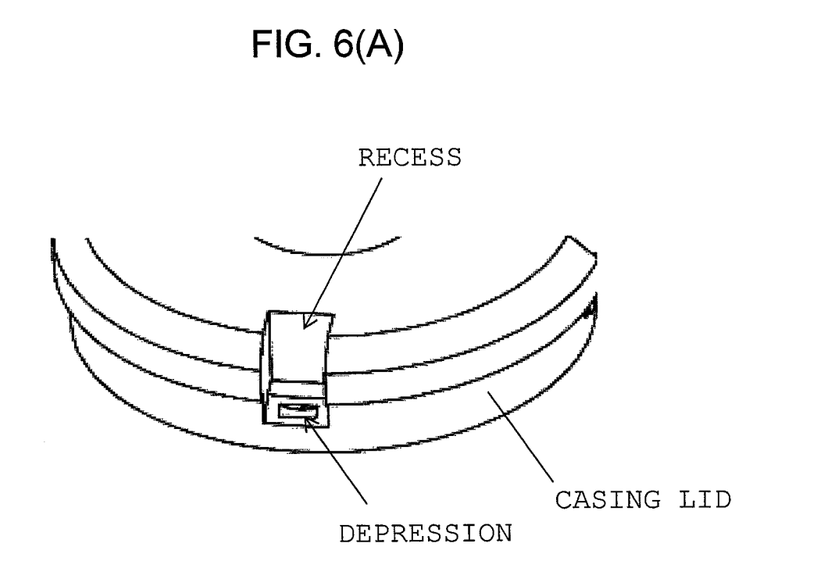
FIGS. 6A to 6C are a set of views showing further groove shapes.
Figure 6B:
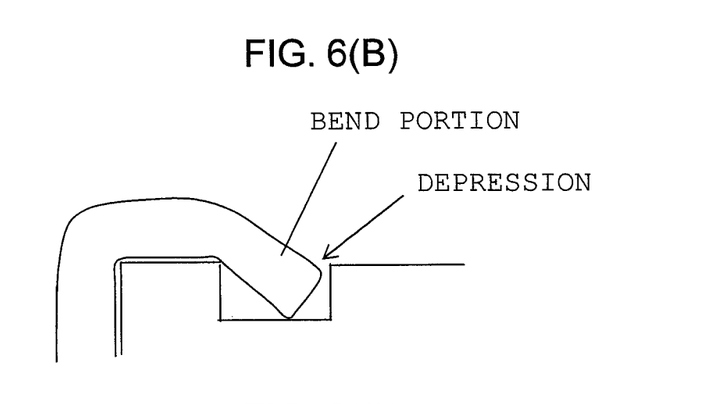
Figure 6C:
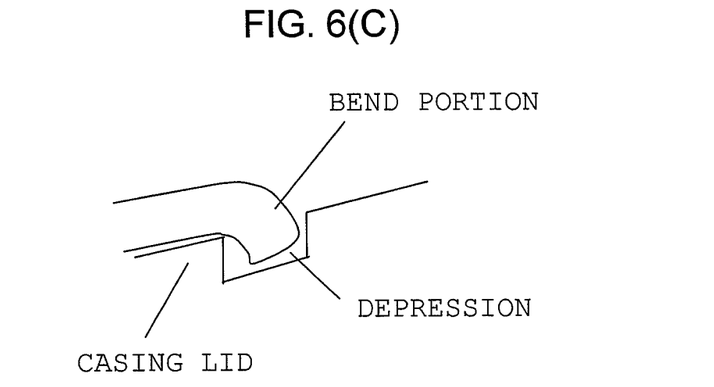

FIGS. 6A to 6C are a set of views showing further groove shapes. FIG. 6(A) is a perspective view of a casing lid having a recess, and FIGS. 6(B) and 6(C) are sectional views of different groove shapes. As shown in FIG. 6(B), the bend portion is bent in such a manner that the tip of the bend portion enters a depression (groove). At this time, as in the case of the above-mentioned examples, the opposite sides of the bend portion bite into the opposite sides of the depression. Also, as shown in FIG. 6(C), the upper surface of the casing lid which receives the bend portion can be sloped in such a manner as to ascend from the outer circumference of the casing lid toward the center of the casing lid.

Figure 7A:
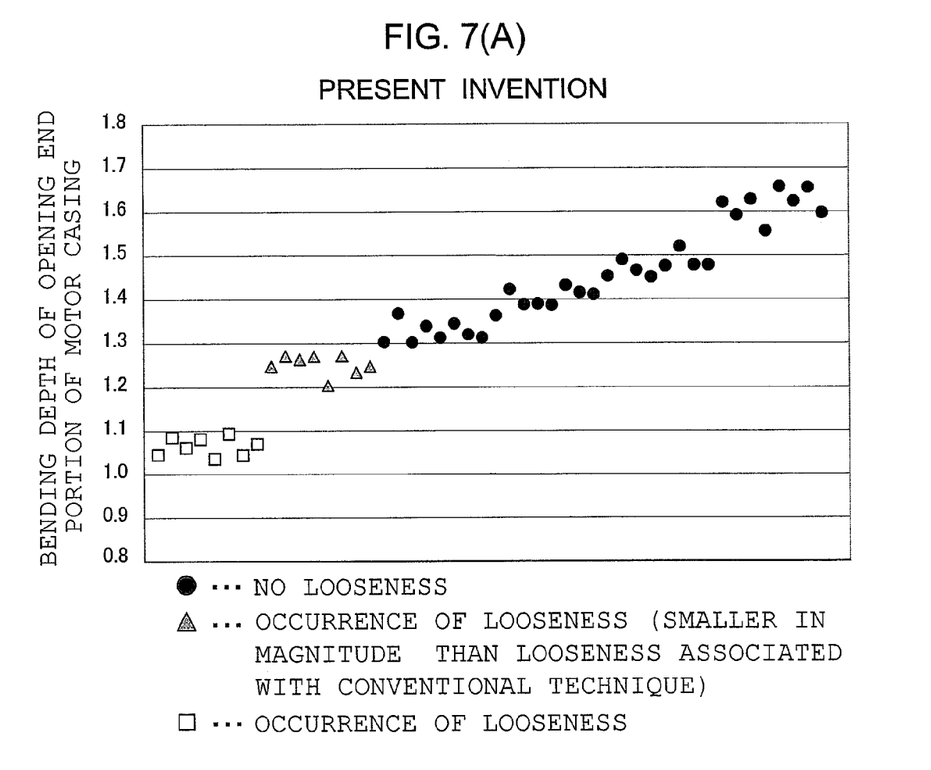
FIGS. 7A and 7B are a pair of graphs for comparison of conditions of occurrence of looseness at portions of fixation between the motor casing and the casing lid as observed after being allowed to stand at 100° C. for one hour.
Figure 7B:
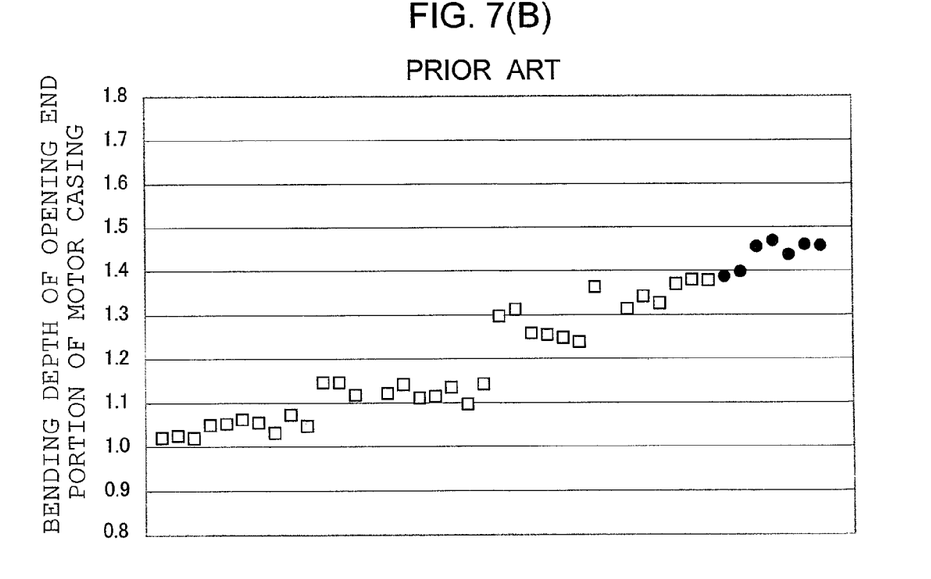

FIGS. 7A and 7B are a pair of graphs for comparison of conditions of occurrence of looseness at portions of fixation between the motor casing and the casing lid as observed after being allowed to stand at 100° C. for one hour. FIG. 7(A) is a view showing the condition of occurrence of looseness associated with the technique of the present invention (groove shape of FIG. 3). FIG. 7(B) is a view showing the condition of occurrence of looseness associated with the conventional technique shown in FIG. 8. In the graphs, the vertical axis indicates the bending depth (see FIG. 4(A)) of an opening end portion of the motor casing. On the basis of the present invention and the conventional technique, a plurality of test motors having different bending depths were fabricated. The test motors were allowed to stand in an environment of 100° C. for one hour and were then examined for the condition of occurrence of looseness at a portion of fixation between the motor casing and the casing lid. In the case of use of the conventional technique, looseness at a portion of fixation occurred unless the bending depth was about 1.4 mm or greater. In the case of use of the technique of the present invention, an improvement was made in restraint of looseness at a portion of fixation as compared with the case of use of the conventional technique; even at a bending depth of about 1.2 mm, looseness associated with the present invention was smaller in magnitude than that associated with the conventional technique; and at a bending depth of about 1.3 mm, the occurrence of looseness was not observed at all.

Although only a few exemplary embodiments of the present invention have been described in detail above, many modifications are possible in the exemplary embodiments without materially departing from the novel teachings and advantages of the invention.

The invention claimed is:

1. A motor comprising:
  a casing lid made of resin, said casing lid having a plurality of fixation portions along an outer circumference thereof, each of said fixation portions including a groove defining spaced apart contact regions and a noncontact region between the contact regions; and
  a motor casing made of metal, the motor casing comprising a motor casing wall defining an opening portion with bend portions formed at the opening portion, the bend portions including spaced apart contact regions that bite into the spaced apart contact regions of the respective fixation portions of the casing lid and the bend portions including noncontact regions which do not come into contact with the casing lid, the bend portions biting into the spaced apart contact regions to fix the motor casing and the casing lid together and force resin displaced from spaced apart contact regions into the respective noncontact region, wherein the contact regions are on each side of the groove and the noncontact region is at least in a portion of a surface of the groove and the contact regions are defined by the groove based on a change in surface elevation between the surface of the groove and surfaces of the contact regions, wherein the groove has a surface elevation that varies from an elevation adjacent to contact regions to a surface elevation of a central groove region wherein said elevation adjacent to contact regions is closer to a surface elevation of the contact regions than the surface elevation of the central groove region.

2. A motor comprising:
  a casing lid made of resin, said casing lid having a plurality of fixation portions defined by recesses along an outer circumference thereof, each of said recesses including a fixation surface with a groove defining spaced apart contact regions and a noncontact region between the contact regions; and
  a motor casing made of metal, the motor casing comprising a motor casing wall defining an opening portion with bend portions formed at the opening portion, the bend portions including spaced apart contact regions that bite into the spaced apart contact regions of the respective fixation portions of the casing lid and the bend portions including noncontact regions which do not come into contact with the casing lid, the bend portions biting into the spaced apart contact regions to fix the motor casing and the casing lid together and force resin displaced from spaced apart contact regions into the respective noncontact region, wherein the contact regions are on each side of the groove and the noncontact region is at least a portion of a surface of the groove and the contact regions are defined by the groove based on a change in surface elevation between the surface of the groove and surfaces of the contact regions, wherein the groove has a surface elevation that varies from an elevation adjacent to contact regions to a surface elevation of a central groove region wherein said elevation adjacent to contact regions is closer to a surface elevation of the contact regions than the surface elevation of the central groove region.

* * * * *